June 8, 1926.
L. J. GRUBMAN
1,588,353
MEANS FOR CONNECTING A FLEXIBLE BODY WALL TO A BELLOWS HEAD
Filed March 11, 1924
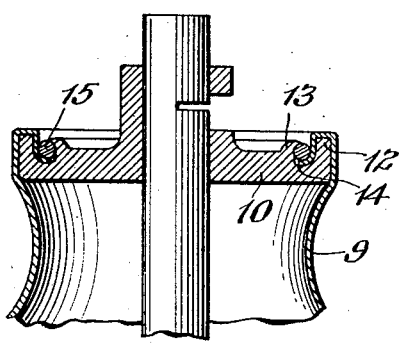
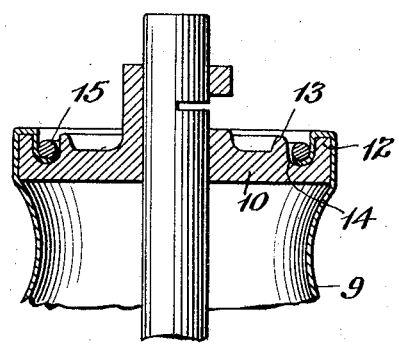
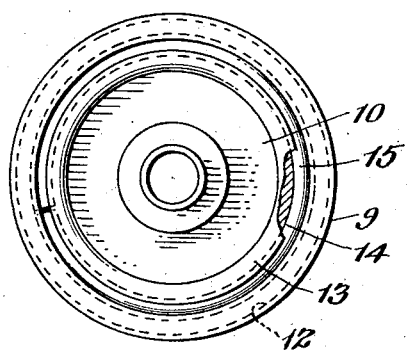
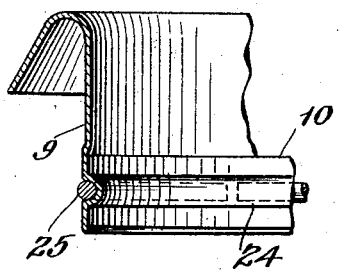
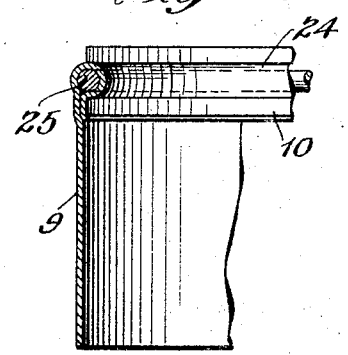
INVENTOR
Leo J. Grubman
BY
his ATTORNEY Patented June 8, 1926.

1,588,353

UNITED STATES PATENT OFFICE.

LEO J. GRUBMAN, OF NEW YORK, N. Y., ASSIGNOR TO VOICES, INCORPORATED, OF NEWARK, NEW JERSEY, A CORPORATION OF DELAWARE.

MEANS FOR CONNECTING A FLEXIBLE BODY WALL TO A BELLOWS HEAD.

Application filed March 11, 1924. Serial No. 698,356.

This invention relates to an improved means for connecting a flexible body wall to a bellows head and has particular relation to that type of bellows which has come into very general use in recent years in connection with sound producing devices for dolls and other toys. In such devices the bellows is usually of cylindrical form and has a flexible body wall suitably fixed at one of its ends and connected at its other end to a movable air expelling head. Heretofore, the end of the flexible bellows wall has been connected to the movable head either by the use of a suitable adhesive or by means of a clamping ring whereby the end of the tubular wall is held in connection with the head by a frictional clamping pressure. In the use and application of these frictional clamping rings, in some instances, due to imperfections either in the ring or in the structure of the bellows head, an absolutely air tight connection between the flexible bellows wall and the movable head could not be secured. Also, these clamping rings must be made with great accuracy, since they are retained in position solely by friction, and are therefore an appreciable item of expense in the manufacture of such devices.

It is the primary purpose of my present improvements to provide a clamping ring for holding the end of the flexible bellows wall in connection with the movable head, said ring being preferably formed of resilient steel wire and the head being provided with means acting to prevent displacement of the ring from its operative position in clamping engagement with the bellows wall. In a preferred embodiment of the invention, the bellows head is formed with a groove to receive the end edge of the bellows wall and the clamping ring, said head having an annular rib at one side of the groove therein which is pressed or turned over and upon the clamping ring, whereby the latter is permanently fixed to the head.

With the above and other objects in view, the invention consists in the improved means for connecting the flexible wall to the bellows head, as will be hereinafter more fully described, illustrated in the accompanying drawings and subsequently incorporated in the subjoined claims.

In the drawings wherein I have disclosed several simple and practical embodiments of my present improvements and in which similar reference characters designate corresponding parts throughout the several views, Figure 1 is a sectional view through the bellows head illustrating one embodiment of the invention and showing the flexible bellows wall permanently fixed to the marginal portion of said head;

Figure 2 is a view similar to Figure 1 illustrating the head construction with the clamping ring engaged upon the edge of the flexible bellows wall before said ring is permanently fixed in place;

Figure 3 is a plan view; and,

Figures 4 and 5 are detail sectional views of another possible embodiment of my present improvement.

The particular features of construction constituting the subject matter of my present application are herein illustrated as designed for use in connection with sound producing devices of that type intended for use in connection with dolls or other toys and in which the various operating parts are enclosed within a casing or housing, usually of cylindrical shape (not shown). A typical device of this character is disclosed in my co-pending application for patent, filed March 11th, 1922, Serial No. 542,884, in which a bellows is provided having a cylindrical wall with a gravity movable head connected to one end thereof and said head being guided in its movement by a central fixed post or tube, said tube and the head having coacting sound controlling means. However, no claim is made herein to such means for automatically controlling the emission of sound since this subject matter is claimed in the application referred to, the novel features of the present disclosure residing solely in the new means which I employ for connecting the flexible tubular wall of the bellows to the movable head.

Referring now more particularly to Figures 1, 2, and 3 of the drawings, the bellows head 10 as therein shown, is formed with an outer circumferential marginal flange 12. In spaced relation to this flange and concentric therewith an annular rib 13 is formed upon said head, while between the flange 12 and the rib 13 an annular channel or groove 14 having a concave surface is produced.

In assembling the parts, the head 10 is inserted within one end of the tubular bellows wall 9 and the end edge of said wall is turned inwardly over the flange 12 on said head so that it extends into the channel or groove 14 upon the concave surface thereof. A metal ring or annulus 15 is then engaged in the channel or groove 14 upon the edge of the flexible bellows wall. Preferably, I employ a split expansible steel ring which is first slightly contracted before it can be placed in the groove 14 so that upon release of the ring it exerts an outward expanding force against the edge of the bellows wall. Finally, by means of a suitable tool, pressure is applied against the inner side of the annular rib 13 to force the same outwardly over and upon the inner side of the ring 15 as clearly shown in Figure 1 of the drawings. In this manner the ring is forced downwardly upon the edge of the flexible bellows wall and caused to very tightly clamp the same against the inner face of the flange 11 and the surface of the channel or groove 14 of the bellows head. It will also be observed that when this rib 13 is thus engaged upon the ring 15, the latter is permanently held or secured in place so that it cannot by any possibility, become displaced from the channel or groove 14 and release the edge of the flexible bellows wall whereby the latter might become detached from the head 10. It will thus be seen that I provide a means for easily, quickly and very securely connecting the end of the tubular bellows wall to the movable air expelling head. This fastening or securing means likewise effectively obviates the possibility of air leakage from the bellows chamber between the end edge of the flexible wall and the movable head 10.

In Figures 4 and 5 of the drawing, I show another practical means for attaching the flexible bellows wall to the movable head, in which case the head 10 is provided with a circumferential groove 24 in its peripheral face. The bellows head is of a diameter slightly greater than the internal diameter of the tubular flexible bellows wall, so that when the latter is drawn over the head 10, said bellows wall will be expanded or diametrically stretched, thus producing a very tight fit of the bellows head in the end of said tubular wall. The clamping ring 25 is then applied and forces the flexible bellows wall where it extends across the groove 24 into said groove and holds said flexible wall with uniform frictional pressure against the surface of said groove. This ring 25 is also split and must be slightly expanded outwardly in order to force the same over the periphery of the bellows head so that it will by contraction positively force the flexible bellows wall into the groove 24. It will be noted that in this construction the part of the bellows head at each side of the groove 24 provides a stop flange or shoulder preventing movement of the clamping ring axially upon the bellows head out of its position in the groove 24. After the clamping ring has been applied, the flexible bellows wall is then reversed from the position shown in Figure 4 or turned inside out and over the outer side of the clamping ring 25, thus completely covering and enclosing said ring as shown in Figure 5 of the drawing.

From the foregoing description considered in connection with the accompanying drawing, the construction, manner of operation and several advantages of the illustrated embodiments of the device will be clearly understood. It will be seen that I have entirely dispensed with the use of adhesives and other means heretofore used in the art which have been found objectionable primarily for the reason that they prevent the rapid assemblage and connection of the parts and are also more or less unreliable in the functional operation of the device. My improved means for connecting the movable air expelling head to the flexible wall of the bellows as herein described has been found entirely satisfactory in practical operation and affords a very simple and inexpensive means which not only produces a secure and reliable connection but also enables the parts to be properly assembled with great rapidity.

In my present disclosure I have illustrated several practical examples for accomplishing the desired purpose, but it is to be understood that they are merely suggestive and that the essential feature might also be exemplified in various other alternative constructions, and I accordingly reserve the privilege of resorting to all such legitimate changes in the form, proportion and relative arrangement of the several parts as may be fairly embodied within the spirit and scope of the invention as claimed.

I claim:

1. In combination with a reciprocating head for one end of a chamber, means for sealing said end of the chamber comprising a flexible element adapted to be engaged with a marginal portion of the head, means for frictionally clamping said flexible element in connection with said head, and a part inseparably carried by said head and engageable upon said clamping means to immovably lock the latter in place.

2. In a sound producing device, a bellows having a flexible body wall and a movable head provided with an annular groove to receive one edge of said body wall, a split resilient clamping ring engaged with the body wall of the bellows to urge the same into frictional engagement with the bellows head and confine the end of said wall within said groove, and said head at one side of the groove therein having a continuous annular portion extending upon said ring to lock the latter in position.

3. In a sound producing device, a bellows having a movable head and a flexible body wall having one end edge thereof turned inwardly over the marginal portion of said head, a clamping ring engaged with said end edge of the bellows to frictionally clamp the same to said head and said head having a part engaging the clamping ring to lock said ring in effective engagement with the edge of the flexible bellows wall.

4. In a sound producing device, a bellows having a flexible tubular body wall and a movable head, one end edge of said flexible wall being inwardly turned over the marginal portion of said head, said head being provided in one side thereof with an annular groove receiving the end edge of said flexible bellows wall, and clamping means engaged in said groove and frictionally holding the end edge of the flexible wall in contact with the surface thereof.

5. In a sound producing device, a bellows having a flexible tubular body wall and a movable head, one end edge of said flexible wall being inwardly turned over the marginal portion of said head, said head being provided in one side thereof with an annular groove receiving the end edge of said flexible bellows wall, clamping means engaged in said groove and frictionally holding the end edge of the flexible wall in contact with the surface thereof, and means on the bellows head engaging the clamping means to lock the latter permanently in said groove.

6. In a sound producing device, a bellows having a flexible body wall and a movable head, said head having a marginal circumferential flange thereon and one end edge of the body wall being turned inwardly over said flange, and means carried by said head for frictionally clamping the end edge of the flexible wall against the inner face of said flange.

7. In a sound producing device, a bellows having a flexible body wall and a movable head, said head having a marginal circumferential flange thereon and one end edge of the body wall being turned inwardly over said flange, a clamping ring carried by said head coacting with the end edge of the flexible wall to frictionally hold the same upon the inner face of said flange, and means on said head engaged with the clamping ring to permanently lock the same in fixed relation to said head.

8. In a sound producing device, a bellows having a flexible body wall and a movable head provided with an outer circumferential flange and an annular rib concentrically spaced from said flange, one end edge of the flexible wall being turned inwardly over said flange, a clamping ring positioned between said rib and flange to frictionally hold the edge of said flexible wall against the inner face of said flange, and said annular rib being engaged over the inner side of said ring to permanently lock the latter in connection with said head.

9. In a sound producing device, a bellows having a flexible body wall and a movable head provided with an outer marginal flange and an annular rib spaced concentrically from said flange, said head between the rib and flange being formed with an annular channel, the end edge of said flexible wall being turned inwardly over said flange and engaged in said channel, and a clamping ring disposed in said channel and holding said edge of the flexible wall in tight frictional engagement against the inner face of said flange and the surface of said channel, said rib being engaged with the inner side of said clamping ring to permanently lock the latter in connection with said head.

10. In a sound producing device, an air expelling bellows having a flexible tubular body wall and a movable head for one end of the bellows, the end edge of the bellows wall being turned inwardly over the marginal portion of said head, means exerting a frictional clamping pressure against the end edge of the bellows, and additional means constituting a part of said head and engaging said clamping means to permanently lock the latter in its effective clamping position.

In testimony that I claim the foregoing as my invention, I have signed my name hereto.

LEO J. GRUBMAN.